Sept. 15, 1953 J. W. GREIG 2,651,986
DASH PANEL
Filed Jan. 19, 1951
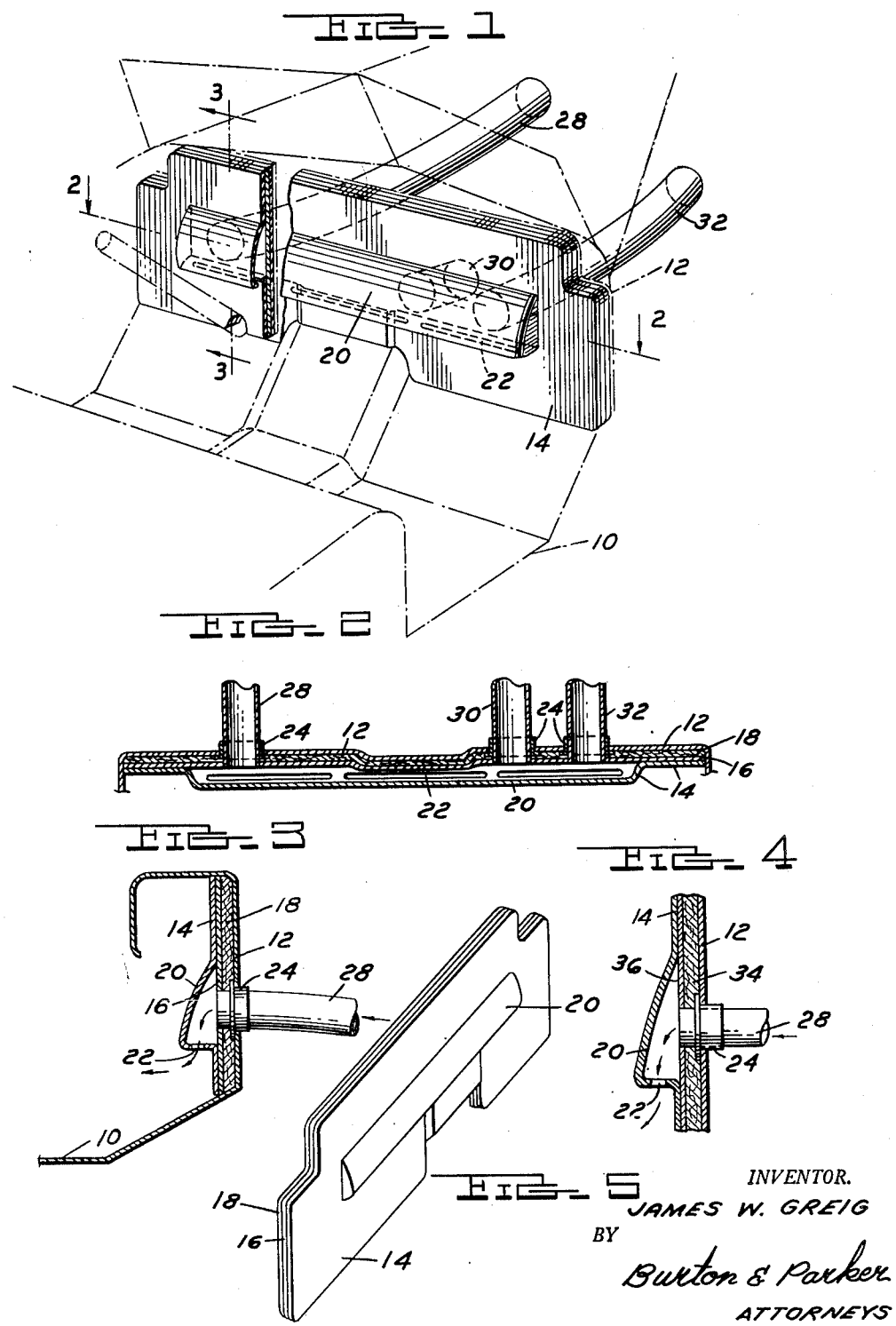
INVENTOR.
JAMES W. GREIG
BY
Burton & Parker
ATTORNEYS Patented Sept. 15, 1953

2,651,986

UNITED STATES PATENT OFFICE 2,651,986

DASH PANEL

James W. Greig, Detroit, Mich., assignor to Woodall Industries, Inc., Detroit, Mich., a corporation of Michigan Application January 19, 1951, Serial No. 206,877

4 Claims. (Cl. 98—2)

1

This invention relates to an improved automobile dash panel and particularly to a combined dash panel and air chamber assembly.

An object is to provide an automobile dash panel which includes as an integral part thereof a plenum chamber adapted to communicate with a source of air such as a heater or fresh air intake to receive air therefrom and provided with suitable air discharge outlets.

Heretofore it has been the common practice to provide dash panels and plenum chambers as distinct and separate elements though the plenum chamber might be mounted upon the dash panel for support. It has also been common practice to provide dash panels of a plurality of layers or laminations of material secured together to form the complete assembly. In one common form of dash panel there was an outer finish layer of composition fibrous material to which was secured one or more layers of insulation material.

In the dash panel of this invention the plenum chamber constitutes an integral part of the dash panel itself. In one embodiment two adjacent layers of the material which make up the dash panel have opposed areas spread apart forming the plenum chamber therebetween. One or more intake ducts extend through one of the layers to deliver air into the chamber and air discharge ducts extend through the other of such layers for the discharge of air from the chamber.

Such plenum chamber may be formed between the outer finish layer and the coextensive overlying insulation layer. If the insulation layer which constitutes one side wall of the chamber is formed of particularly loosely integrated material it may have its inner surface throughout the chamber covered with an impervious sheet secured to the finish layer about the boundary of the chamber. One of said layers may be formed of readily deformable material and bumped out to provide chamber space.

In one preferred embodiment of the invention the dash panel is a laminated structure comprising an outer finish layer of composition asphalt impregnated fibrous material and the insulation layer is a loosely integrated fibrous material. These layers are secured together adjacent the margins of the panel but they are spaced apart throughout a portion of the interior expanse of the panel to provide the plenum chamber. The deformable layer may be bumped out away from the insulation layer to provide the chamber space and such bumped out portion may exhibit a bottom wall provided with air outlet passageways.

Other embodiments of the invention may be

2 provided also within the scope therewith and will more fully appear from the following specification, claims and accompanying drawing, wherein Fig. 1 is a perspective of a dash panel partly broken away illustrated as installed in position in a vehicle body partially outlined;

Fig. 2 is a horizontal sectional view taken on the line 2—2 of Fig. 1;

Fig. 3 is a vertical sectional view taken on the line 3—3 of Fig. 1;

Fig. 4 is a sectional view similar to that of Fig. 3 illustrating a slightly modified form of construction; and Fig. 5 is a perspective of a dash panel embodying the invention.

In the drawing a part of the interior of an automobile body is shown in dotted outline in Fig. 1, wherein the floor is indicated as 10 and leads up to the fire wall or upright dash partition 12 which separates the body from the engine compartment underneath the hood. It is customary to provide a dash panel assembly which is secured to this upright wall 12 and such dash panel assembly ordinarily is made up of a plurality of laminations of material. Such panel includes an outer finish layer which is exposed to the inside of the body and is here indicated by the numeral 14 and an insulation layer which is ordinarily coextensive with the finish layer and lies against the steel sheet 12.

In the construction shown in Figs. 1 and 2 three coextensive laminations of material are illustrated. There is the finish layer 14 which may be of an asphalt composition fibrous character such as commercial K-B board, which is a rugged inexpensive relatively strong deformable sheet. Adjacent to this finish layer is a layer of asphalt saturated felt 16 which serves as a cushion and insulation layer. Adjacent to the felt layer may be a layer of fiberglass or rockwool 18 which provides good insulation characteristics. These several layers are substantially coextensive and adhesively secured together.

In the dash panel of the instant invention, the finish layer 14 is bumped out of its normal plane to provide a portion 20 spaced from the layers 16 and 18 to provide an air chamber within such bumped out area. This portion 20 has its bottom wall provided with perforations 22 forming air ducts for the passage of air therethrough into the interior of the vehicle body. The saturated felt layer 16 is adhesively secured to the finish layer surrounding the bumped out portion to provide a seal thereabove. The insulating layers 16 and 18 are provided with suitable air duct openings therethrough into the interior of the chamber. As illustrated in the drawing, the sheet metal wall 12 is provided with thimbles 24 extending therethrough and air pipes 28, 30 and 32 extend through said thimbles and through the laminations 18 and 16 into the chamber. Air pipes 28 and 32 may be cold air pipes leading from a fresh air intake. Air pipe 30 may be an air pipe leading from a heater.

In Fig. 4 the dash is shown as made up of an outer finish layer 14 and a loosely integrated layer of insulation material such as fiberglass 34. This insulation material is very loosely integrated and to provide a suitable impervious liner for the chamber overlying the loose insulation sheet, there is provided a suitable sheet of saturated paper or plastic 36. Such sealing sheet may be secured in place to the outer finish layer 14 and to the insulation layer.

It will be seen that this dash includes as a self-contained portion the plenum chamber and that the dash may be attached as an assembly to the metal wall 12 and the air ducts hooked up as illustrated.

What I claim is:

1. An automobile dash panel adapted to overlie the fire wall which separates the engine compartment from the passenger compartment of an automobile body, said panel comprising an outer finish lamination adapted for exposure within the passenger compartment and a complementary lamination of insulation material secured to the finish lamination and adapted to overlie the fire wall, said laminations being substantially coextensive and substantially coextensive with that portion of the fire wall within the passenger compartment of the body, said laminations being spread apart throughout complementary areas providing an air chamber therebetween, said chamber provided with an air intake passageway thereinto from the engine compartment and with an air exhaust opening leading therefrom into the passenger compartment.

2. In an automobile body having an engine compartment separated from a passenger compartment by a fire wall, a dash panel comprising an outer finish lamination of deformable material and a lamination of insulation material secured to the finish lamination, said two laminations being substantially coextensive and substantially coextensive with the fire wall within the passenger compartment, said finish lamination being deformed out of its normal plane and away from the insulation lamination throughout an area spaced inwardly from the outer margin of the panel providing an air chamber between said laminations throughout said area, said laminations being sealed together surrounding said area, said chamber provided with an air intake leading thereinto through the fire wall and with an air outlet passageway through the deformed portion of the finish laminations.

3. An automobile dash panel of the character defined in claim numbered 2 characterized in that the finish lamination is so deformed as to exhibit a bottom wall for the chamber which bottom wall projects normal to the plane of the dash panel and is provided with a plurality of air outlet passageways therethrough.

4. An automobile dash panel adapted to overlie the fire wall which separates the engine compartment from the passenger compartment of an automobile body, said panel comprising an outer finish lamination adapted for exposure within the passenger compartment and a complementary lamination of insulation material secured to the finish lamination and adapted to overlie the fire wall, said laminations being substantially coextensive and substantially coextensive with that portion of the fire wall within the passenger compartment of the body, said laminations being spread apart throughout complementary areas providing an air chamber therebetween, said chamber provided with an air intake passageway thereinto and with air exhaust openings leading therefrom into the passenger compartment, said complementary lamination of insulation material consisting of two layers of material one being a layer of loosely integrated fibrous material and the other being a layer of densely integrated fibrous asphalt material, said last mentioned layer forming with the finish layer the opposed walls of the chamber, said finish layer being deformed away from the opposite wall of the chamber to define the chamber.

JAMES W. GREIG.

References Cited in the file of this patent

UNITED STATES PATENTS

| Number | Name | Date |
|---|---|---|
| 1,643,279 | Kress et al. | Sept. 20, 1927 |
| 1,759,001 | Cherry et al. | May 20, 1930 |
| 2,189,406 | Roberts | Feb. 6, 1940 |
| 2,306,796 | Staley et al. | Dec. 29, 1942 |
| 2,515,950 | Dingman | July 18, 1950 |
| 2,550,353 | Hopfinger | Apr. 24, 1951 |